United States Patent Office 2,785,982
Patented Mar. 19, 1957

2,785,982
COLD MIX CAKE ICING

Miles A. Weaver, Ithaca, and George K. Greminger, Jr., Midland, Mich., assignors to The Dow Chemical Company, Midland, Mich., a corporation of Delaware No Drawing. Application September 21, 1953,
Serial No. 381,493

6 Claims. (Cl. 99—139)

This invention relates to an improvement in icings for cakes, and particularly to cold mixed or uncooked icings.

Cake icings which require no cooking are well known and widely used. The dry ingredients for such icings are sold as powdered mixtures in retail stores in the United States, and require merely the addition of specified amounts of water to prepare an easily applied icing. Similar mixtures are sold in large quantities to commercial bakeries, but commonly differ from the small package retail product in requiring the addition of some shortening and some sugar, as well as water.

A typical uncooked icing consists essentially of powdered sugar, shortening, flavoring, coloring and water. The water is added to make a smooth paste which is spread evenly over the cake. Such an icing dries on standing, and, within a few hours cracks and tends to flake from the cake, leaving the latter rather unattractive.

It would be desirable, and it is the principal object of this invention, to provide a cold mix cake icing which will remain soft enough to show no cracking or flaking tendency for at least a day. Another object is to provide such an icing in which the normal amounts of shortening and sugar may be reduced. Other and related objects may appear hereinafter.

It has now been found that an improved icing may be made, having the desired characteristics, by incorporating in the icing ingredients from 3 to 7 ounces, dry weight, for each 32 fluid ounces of liquid ingredient, of a high viscosity type of a water-soluble cellulose ether from the class consisting of methyl cellulose, hydroxypropyl methyl cellulose, carboxymethyl methyl cellulose and carboxymethyl hydroxyethyl cellulose. In the last two named compounds the amount of carboxymethyl substituent should be relatively much smaller than the methyl or the hydroxyethyl substituent (preferably 0.05 to 0.5 carboxymethyl and 1.5 to 2 methyl or 0.5 to 2 hydroxyethyl groups per $C_6$ unit). These cellulose ethers should all be of a type whose 2 percent solution by weight in water at 20° C. has a viscosity of at least 1000 centipoises, and viscosity ratings from 2000 to 5000 are preferred.

The addition of from 3 to 7 ounces, preferably from 4 to 6 ounces, of one of the named cellulose ethers for each 32 fluid ounces of water or aqueous liquid permits the icing to form a hard crust but prevents it from flaking from the cake. In addition, the cellulose ethers reduce the amount of shortening required and increase the viscosity of the icing enough so that less than the usual amount of powdered sugar is needed.

The following examples illustrate the invention. For purpose of contrast, examples are given in which too much or too little cellulose ether was present, and a comparison is made with the results obtained using a standard recipe containing:

Shortening—1 pound
Water—1 U. S. quart (32 fluid ounces)
Powdered sugar—to desired consistency, usually about 8 pounds

EXAMPLE 1

| | | |
|---|---|---|
| Powdered sugar | pounds | 6 |
| Shortening | ounces | 4 |
| Methyl cellulose, 4000 centipoises | do | 4 |
| Water | fluid ounces | 32 |

Properties of the icing are reported in the table following the examples.

EXAMPLE 2

| | | |
|---|---|---|
| Powdered sugar | pounds | 6 |
| Shortening | ounces | 4 |
| Hydroxypropyl methyl cellulose, 4000 cps | do | 4 |
| Water | fluid ounces | 32 |

EXAMPLE 3

| | | |
|---|---|---|
| Powdered sugar | pounds | 6 |
| Shortening | ounces | 4 |
| Carboxymethyl hydroxyethyl cellulose, 1500 cps | do | 4 |
| Water | fluid ounces | 32 |

EXAMPLE 4

| | | |
|---|---|---|
| Powdered sugar | pounds | 6 |
| Shortening | ounces | 4 |
| Carboxymethyl methyl cellulose, 2000 cps | do | 4 |
| Water | fluid ounces | 32 |

EXAMPLE 5

| | | |
|---|---|---|
| Powdered sugar | pounds | 6 |
| Shortening | ounces | 4 |
| Carboxymethyl cellulose, 3000 cps | do | 4 |
| Water | fluid ounces | 32 |

EXAMPLE 6

| | | |
|---|---|---|
| Powdered sugar | pounds | 6 |
| Shortening | ounces | 4 |
| Methyl cellulose, 4000 cps | do | 2 |
| Water | fluid ounces | 32 |

EXAMPLE 7

| | | |
|---|---|---|
| Powdered sugar | pounds | 6 |
| Shortening | ounces | 4 |
| Methyl cellulose, 4000 cps | do | 8 |
| Water | fluid ounces | 32 |

EXAMPLE 8

| | | |
|---|---|---|
| Powdered sugar | pounds | 6 |
| Shortening | ounces | 4 |
| Water | fluid ounces | 32 |

EXAMPLE 9

| | | |
|---|---|---|
| Powdered sugar | pounds | 10 |
| Shortening | ounces | 4 |
| Methyl cellulose, 4000 cps., 2% solution | fluid ounces | 21 |
| Water (additional) | do | 32 |

Each of the above formulations was used as icing on cakes, and observations were made as to the thickness of the icing, its smoothness, glaze formation, and flaking tendency. The results are given in the following table.

Table

| Example No. | Thickness | Smoothness | Glazing | Flaking and Separation |
|---|---|---|---|---|
| Standard | good | good | good | objectionable. |
| 1 | very good | very good | good | none. |
| 2 | fair | fair | fair | none. |
| 3 | good | fair | good | none. |
| 4 | fair | good | good | none. |
| 5 | poor | poor | poor | none. |
| 6 | fair | good | good | slight. |
| 7 | poor | good | good | none. |
| 8 | poor | poor | poor | complete. |
| 9 | fair | good | fair | slight. |

If the consistency of the icing is such that it is difficult to spread a uniform thickness on the cake, this is considered a disadvantage. Hence, the thickness rating and tendency to flake or separate from the cake were deemed the most important factors in evaluating the several formulas. The several batches using methyl cellulose (Examples 1, 6, 7 and 9) show that 2 ounces of methyl cellulose per quart of water is too little to prevent flaking, and that 8 ounces is too much to permit spreading to a uniform thickness. Carboxymethyl cellulose (Ex. 5) is unsatisfactory, and the composition was very "stringy" and hard to handle. The effective agents (Examples 1–4) permitted a sharp reduction in the proportion of shortening and a reduction in the amount of sugar, 4 ounces of the cellulose ether being substituted for ¾ pound of shortening and 2 pounds of sugar, without significant change in the area to be covered by the batch.

The cellulose ether is most advantageously added as a powder to the sugar and shortening, and mixed therewith, before the water is added. It is possible, therefore, to incorporate the cellulose ether with the other dry ingredients in a ready-mixed icing to be sold in bulk to bakeries or in small packages at retail, to which only water must be added, together with any desired flavoring and color, before use.

The useful cellulose ethers are those which are water-soluble and which have from 0 and 0.5 carboxymethyl substituent per $C_6$ unit. The optimum agent is methyl cellulose.

We claim:

1. A dry mixed uncooked icing composition, the essential constituents of which are sugar, shortening, and a water-soluble cellulose ether having from 0 to 0.5 carboxymethyl substituent per $C_6$ unit and having a viscosity rating of at least 1000 centipoises, as measured at 20° C. on a 2 percent solution by weight in water, the cellulose ether being present in an amount from 3 to 7 ounces for each 32 fluid ounces of water needed to give the required consistency to the icing.

2. The composition claimed in claim 1, wherein the cellulose ether is methyl cellulose.

3. The composition claimed in claim 2, wherein the methyl cellulose has a viscosity rating in the range from 3000 to 5000 centipoises.

4. The composition claimed in claim 1, wherein the cellulose ether is hydroxypropyl methyl cellulose.

5. The composition claimed in claim 1, wherein the cellulose ether is carboxymethyl methyl cellulose.

6. The composition claimed in claim 1, wherein the cellulose ether is carboxymethyl hydroxyethyl cellulose.

References Cited in the file of this patent

UNITED STATES PATENTS

| | | |
|---|---|---|
| 752,660 | Dillard | Feb. 23, 1904 |
| 2,619,423 | Diamond | Nov. 25, 1952 |

OTHER REFERENCES

"Water-Soluble Cellulose Ethers," by Bock; Industrial and Engineering Chemistry, vol. 29, No. 9, September 1937, pp. 985–987.

"A Comparison of Some Ice Cream Stabilizers," by Josephson et al.; reprinted from Southern Dairy Products Journal, April 1943.

"Everybody's Cookbook," by Lord; revised edition, Harcourt, Brace and Company, New York, p. 434.